(12) United States Patent
Murphy et al.

(10) Patent No.: US 7,052,523 B2
(45) Date of Patent: *May 30, 2006

(54) BAGLESS CANISTER VACUUM CLEANER

(75) Inventors: John S. Murphy, Brook Park, OH (US); Robert A. Matousek, Lakewood, OH (US); Jeffrey M. Kalman, Cleveland Heights, OH (US); Craig M. Saunders, Rocky River, OH (US); Richard C. Farone, Willoughby, OH (US); David DiNunzio, Mentor, OH (US); Mark E. Cipolla, Chardon, OH (US); Paul D. Stephens, Twinsburg, OH (US); Michael F. Wright, Stow, OH (US); Robert A. Salo, Mentor, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/790,304

(22) Filed: Mar. 1, 2004

(65) Prior Publication Data

US 2004/0163201 A1    Aug. 26, 2004

Related U.S. Application Data

(63) Continuation of application No. 09/944,731, filed on Aug. 31, 2001, now Pat. No. 6,712,868.

(60) Provisional application No. 60/230,287, filed on Sep. 1, 2000.

(51) Int. Cl.
*B01D 50/00* (2006.01)
*B01D 46/02* (2006.01)

(52) U.S. Cl. .................. 55/330; 55/337; 55/356; 55/357; 55/358; 55/359; 55/385.1; 55/429; 55/459.1; 55/459.2; 55/467; 55/478; 55/482; 55/521; 55/DIG. 3; 15/352; 15/353

(58) Field of Classification Search .......... 55/320, 55/330, 332, 337, 356, 357, 358, 359, 385.1, 55/429, 459.1, 459.2, 467, 478, 482, 521, 55/DIG. 3; 15/352, 353
See application file for complete search history.

(56) References Cited

U.S. PATENT DOCUMENTS 3,599,273 A * 8/1971 Shirayanagi et al. ..... 55/DIG. 3

(Continued)

*Primary Examiner*—Jason M. Greene
(74) *Attorney, Agent, or Firm*—Fay, Sharpe, Fagan, Minnich & McKee, LLP

(57) ABSTRACT

A bagless canister vacuum cleaner includes a selectively removable dirt cup, and an airstream flows rotationally through the dirt cup between an interior wall of the dirt cup and a filter assembly selectively mounted in the dirt cup so that entrained contaminants are separated from the airstream flowing through the dirt cup and collected by the dirt cup. The filter lies substantially parallel to the support surface on which the vacuum cleaner is supported. A cover member is connected to the main housing, and the cover member is selectively movable to and held in an operative position in covering relation with an open first end of a dirt cup. The main housing defines a base conformed to self-support the main housing on a support surface with the dirt cup arranged with its open first end at a higher elevation than its closed second end. The removable dirt cup includes a handle adapted for being held by a user, and the dirt cup defines or includes a spout to facilitate emptying dirt therefrom.

22 Claims, 8 Drawing Sheets

U.S. PATENT DOCUMENTS

| | | | |
|---|---|---|---|
| 3,653,189 A * | 4/1972 | Miyake et al. | 55/DIG. 3 |
| 3,653,190 A * | 4/1972 | Lee et al. | 55/337 |
| 5,979,014 A * | 11/1999 | Reichow et al. | 15/412 |
| 6,256,834 B1 * | 7/2001 | Meijer et al. | 15/352 |
| 6,295,831 B1 * | 10/2001 | Watson | 62/457.3 |
| 6,311,366 B1 * | 11/2001 | Sepke et al. | 15/352 |
| 6,484,350 B1 * | 11/2002 | Yung | 15/352 |
| 6,712,868 B1 | 3/2004 | Murphy et al. | 55/330 |

* cited by examiner

BAGLESS CANISTER VACUUM CLEANER

CROSS-REFERENCE TO RELATED APPLICATION

This application claims the benefit, as a continuation of U.S. application Ser. No. 09/944,731 filed Aug. 31, 2001, now U.S. Pat. No. 6,712,868, and claims priority from and hereby expressly incorporates by reference commonly owned U.S. provisional application No. 60/230,287 filed Sep. 1, 2000.

BACKGROUND OF THE INVENTION

Canister vacuum cleaners are well known and in widespread use. Typically, a canister vacuum cleaner comprises a main body housing including wheels that movably support the housing on a floor or other support surface. The housing carries a suction source such as a motor-driven fan assembly, and defines a bag-receiving region adapted to receive a disposable vacuum bag. An elongated hose extends outwardly from the housing and is in fluid communication with the disposable vacuum bag through a mouth of the bag.

In use of these conventional canister vacuum cleaners, the suction source establishes relative negative pressure inside the bag-receiving region so that an airstream is pulled into the hose and passes therethrough into the bag. Dust, dirt, and other contaminants entrained in the airstream are trapped inside the bag while the airstream passes through the bag and exits the bag-receiving region of the housing. The airstream is then exhausted from the housing by the suction source.

Recently, bagless upright vacuum cleaners have been developed that rely upon a dirt separation chamber to separate contaminants from an airstream without use of a bag. The separated contaminants are collected in a dirt cup or like container which must be emptied periodically. Because these types of vacuum cleaners do not require use of disposable bags, they have been found to be highly convenient and cost-effective to operate.

In light of the success of bagless upright vacuum cleaners, it has been deemed desirable to develop a bagless canister vacuum cleaner displaying corresponding effectiveness and convenience of use.

SUMMARY OF THE INVENTION

In accordance with a first aspect of the present invention, a canister vacuum cleaner includes a body defining a suction inlet and an exhaust outlet, and a suction source contained in the body and located fluidically between the suction inlet and the exhaust outlet. A dirt cup is releasably connected to the body. The dirt cup defines a dirt separation chamber and an airstream outlet that releasably mates with the suction inlet when the dirt cup is connected to the body. The dirt separation chamber is conformed to impart a rotational flow pattern to an airstream passing therethrough whereby contaminants entrained in the airstream are separated from the airstream and deposited in the dirt cup. A filter is located in the dirt separation chamber of the dirt cup in covering relation with the airstream outlet.

In accordance with another aspect of the present invention, a bagless vacuum cleaner includes a body and a dirt cup releasably connected to and selectively separable from the body. A plurality of wheels are each connected to one of the body and the dirt cup and movably support the body and the dirt cup on an associated support surface when the dirt cup is connected to the body. At least one of the wheels is connected to the dirt cup.

In accordance with a further aspect of the present invention, a bagless canister vacuum cleaner includes a main housing defining a suction source inlet, an exhaust outlet and a receiver region adapted to receive a dirt cup. A suction source is located fluidically between the suction source inlet and the exhaust outlet. A dirt cup is releasably coupled to the receiver region of the main housing. The dirt cup includes: (i) an interior wall defining a dirt separation chamber; (ii) an open first end in communication with the dirt separation chamber; and, (iii) a closed second end with an aperture forming an airstream outlet from the dirt separation chamber. The dirt cup is releasably coupled to the main housing with the airstream outlet of the dirt cup mated with the suction source inlet of the main housing. A filter assembly is releasably connected to the dirt cup and is located in the dirt separation chamber. The filter assembly includes a filter element located in covering relation with the airstream outlet of the dirt cup and is positioned so that an annular airflow space is defined between the filter element and the interior wall of the dirt cup. A cover is pivotably connected to the housing and is movable between an open position, where the cover is disengaged from the dirt cup, and a closed, operative position where said the is placed in covering relation with and blocks the open first end of the dirt cup. The cover, when located in the closed position, prevents separation of the dirt cup from the main housing.

In accordance with still another aspect of the invention, a bagless canister vacuum cleaner includes a main housing defining an airflow inlet, an airflow outlet and a receiver region adapted to receive a dirt cup. A suction source is located in the housing and is operational to establish and maintain an airstream that flows from the airflow inlet to the airflow outlet. A dirt cup is releasably coupled to the receiver region of the main housing. The dirt cup includes: (i) an interior wall defining a dirt separation chamber conformed to impart a rotational flow path to a dirty airstream passing therethrough whereby contaminants are separated from the dirty airstream and deposited in the dirt cup; (ii) an open first end in communication with the dirt separation chamber; and, (iii) an airstream outlet from the dirt separation chamber, the dirt cup releasably coupled to the main housing with the airstream outlet of the dirt cup mated with the airflow inlet of the main housing. A filter assembly is releasably connected to the dirt cup and is located in the dirt separation chamber. The filter assembly comprises a filter element located in covering relation with the airstream outlet of the dirt cup. A cover is connected to the housing and is movable between an open position, where it is disengaged from the dirt cup, and a closed, operative position where it is placed in covering relation with and blocks the open end of the dirt cup. The cover, when located in its closed position, prevents separation of the dirt cup from the main housing.

In accordance with a still further aspect of the present invention, a bagless vacuum cleaner includes a main housing defining a suction source inlet, an exhaust outlet and a receiver region adapted to receive a dirt cup. A suction source is located fluidically between the suction source inlet and the exhaust outlet. A dirt cup is releasably coupled to the receiver region of the main housing. The dirt cup includes: (i) an interior wall defining a dirt separation chamber; (ii) an open first end in communication with the dirt separation chamber; and, (iii) an airstream outlet from the dirt separation chamber. The dirt cup is releasably coupled to the main housing with said airstream outlet of the dirt cup mated with the suction source inlet of the main housing. A filter assembly is releasably connected to the dirt cup and is located in the dirt separation chamber. The filter assembly includes a filter element located in covering relation with the airstream outlet of the dirt cup and positioned so that an annular airflow space is defined between the filter element and the interior wall of the dirt cup. A base is connected to the main housing and is conformed to support the main housing, and the dirt cup releasably connected to the receiver region of the main housing, on the support surface in a second, non-operative position, with the open first end of the dirt cup located at a select elevation relative to the dirt separation chamber to prevent spillage of associated dirt and debris contents of the dirt separation chamber from the open first end of the dirt cup.

In accordance with another aspect of the present invention, a vacuum cleaner includes a housing; a dirt cup releasably connected to the housing and defining a dirt separation chamber; a filter located in the dirt separation chamber of the dirt cup; and, a suction source located in the housing and in fluid communication with the dirt separation chamber. The suction source, when selectively operated, establishes and maintains a suction airstream that flows into and through the dirt separation chamber to an exhaust outlet defined by the housing. The suction airstream, when moving through the dirt separation chamber, moves rotationally around a substantially horizontal axis of the filter before passing through the filter and exiting the dirt separation chamber.

In accordance with still another aspect of the present invention, a bagless vacuum cleaner includes a body and a dirt cup releasably connected to and selectively separable from said body. The dirt cup includes a handle and a pour spout.

Still other benefits and advantages of the present invention will become apparent to those of ordinary skill in the art upon reading and understanding the following specification.

BRIEF DESCRIPTION OF THE DRAWINGS

The invention comprises a variety of components and arrangements of components, a preferred embodiment of which is illustrated in the accompanying drawings that form a part hereof and wherein.

DETAILED DESCRIPTION OF PREFERRED EMBODIMENT

Figure 1:
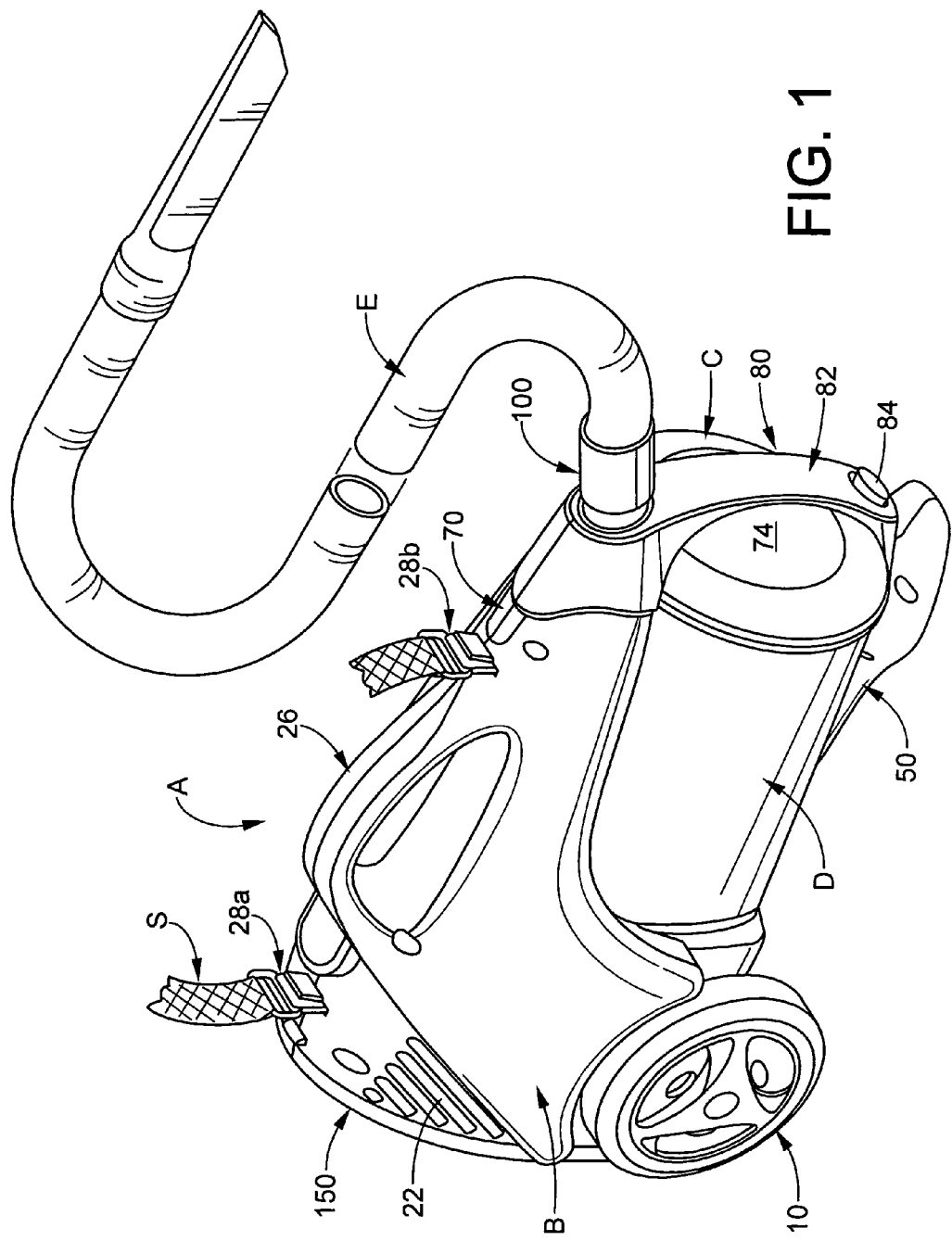
FIG. 1 is a perspective view of a bagless canister vacuum cleaner formed in accordance with the present invention.
Figure 5:
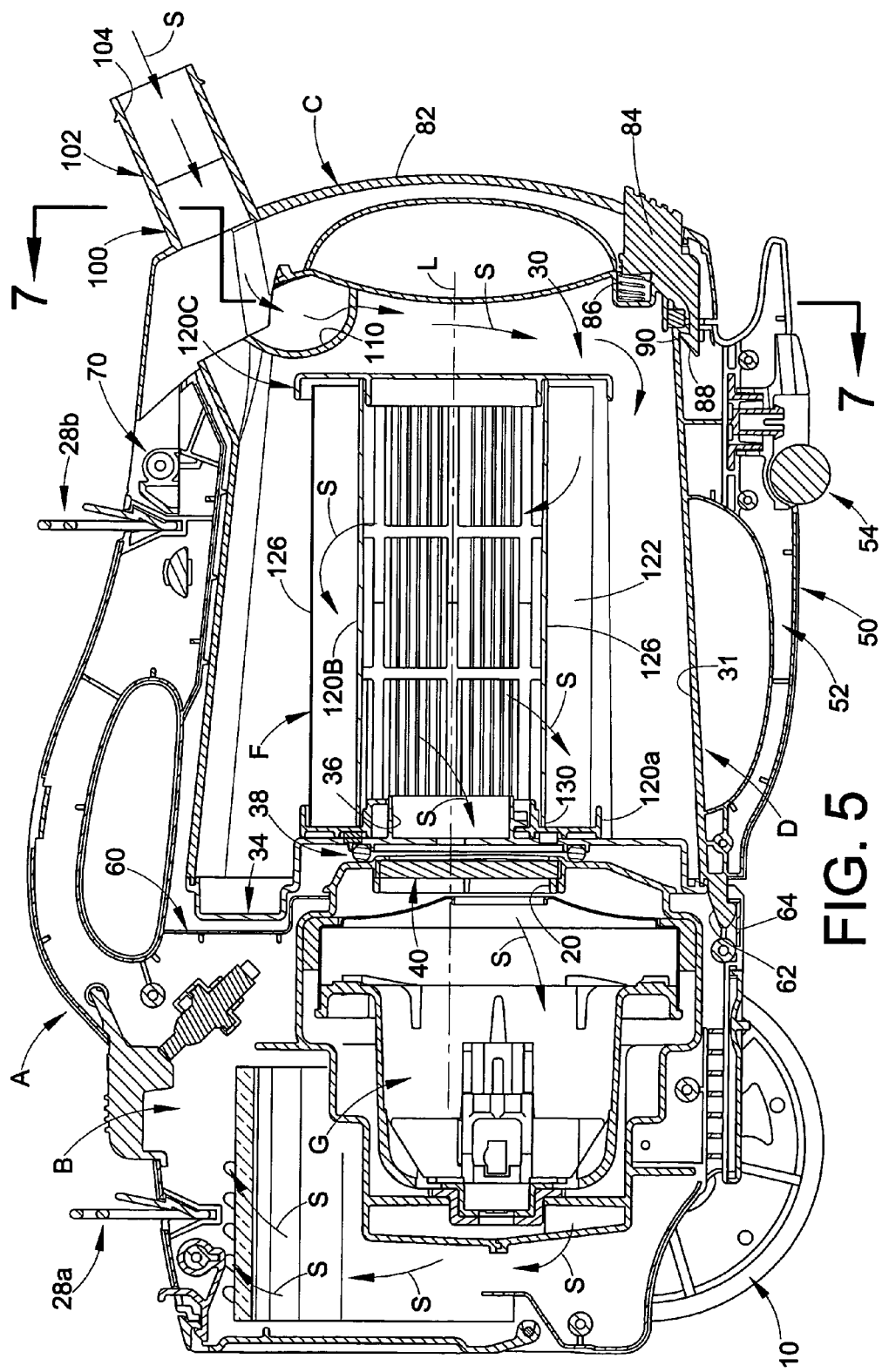
FIG. 5 is a sectional view along line 5—5 of FIG. 3.
Figure 6:
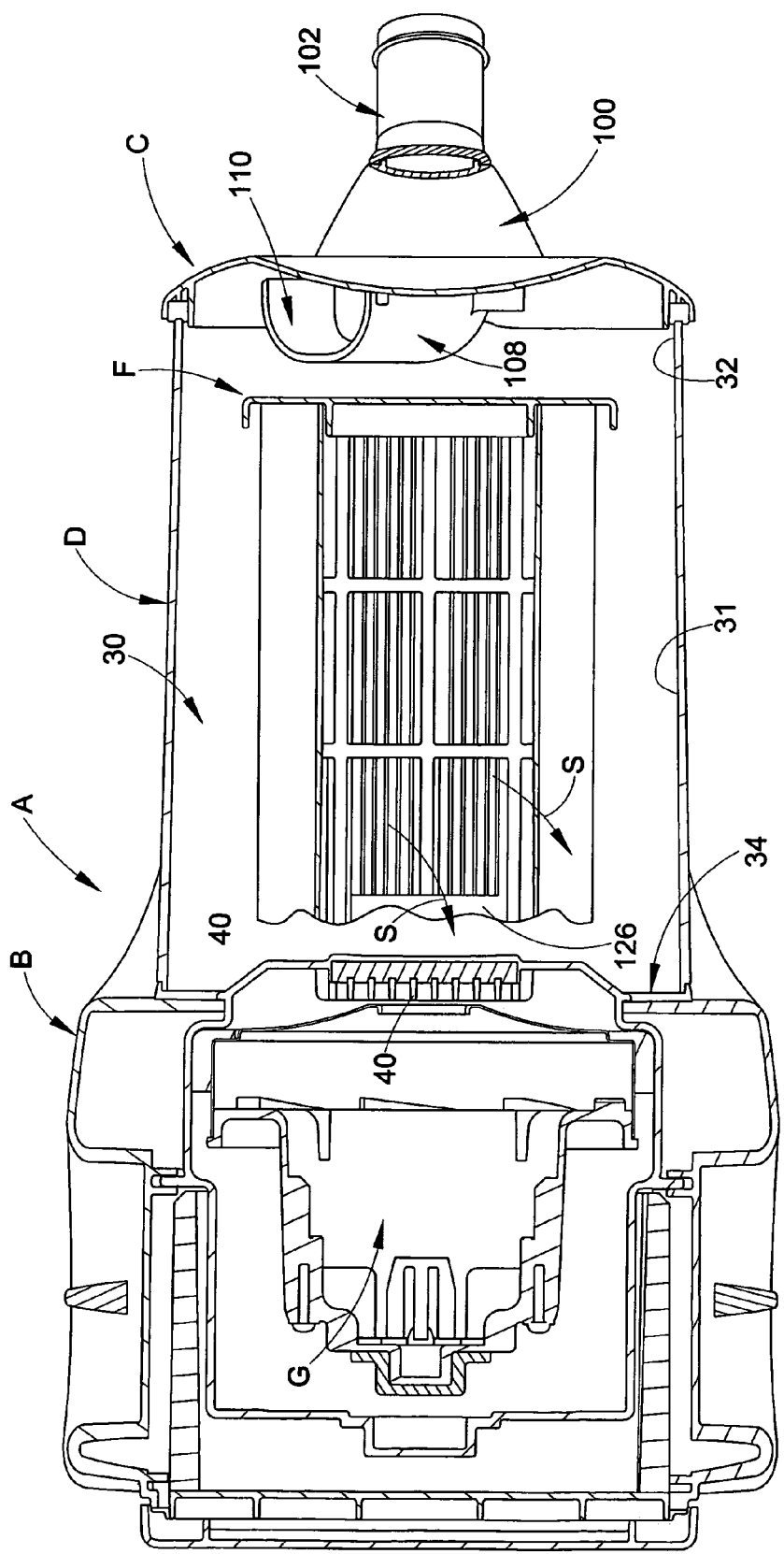
FIG. 6 is a sectional view along line 6—6 of FIG. 2.
Figure 8:
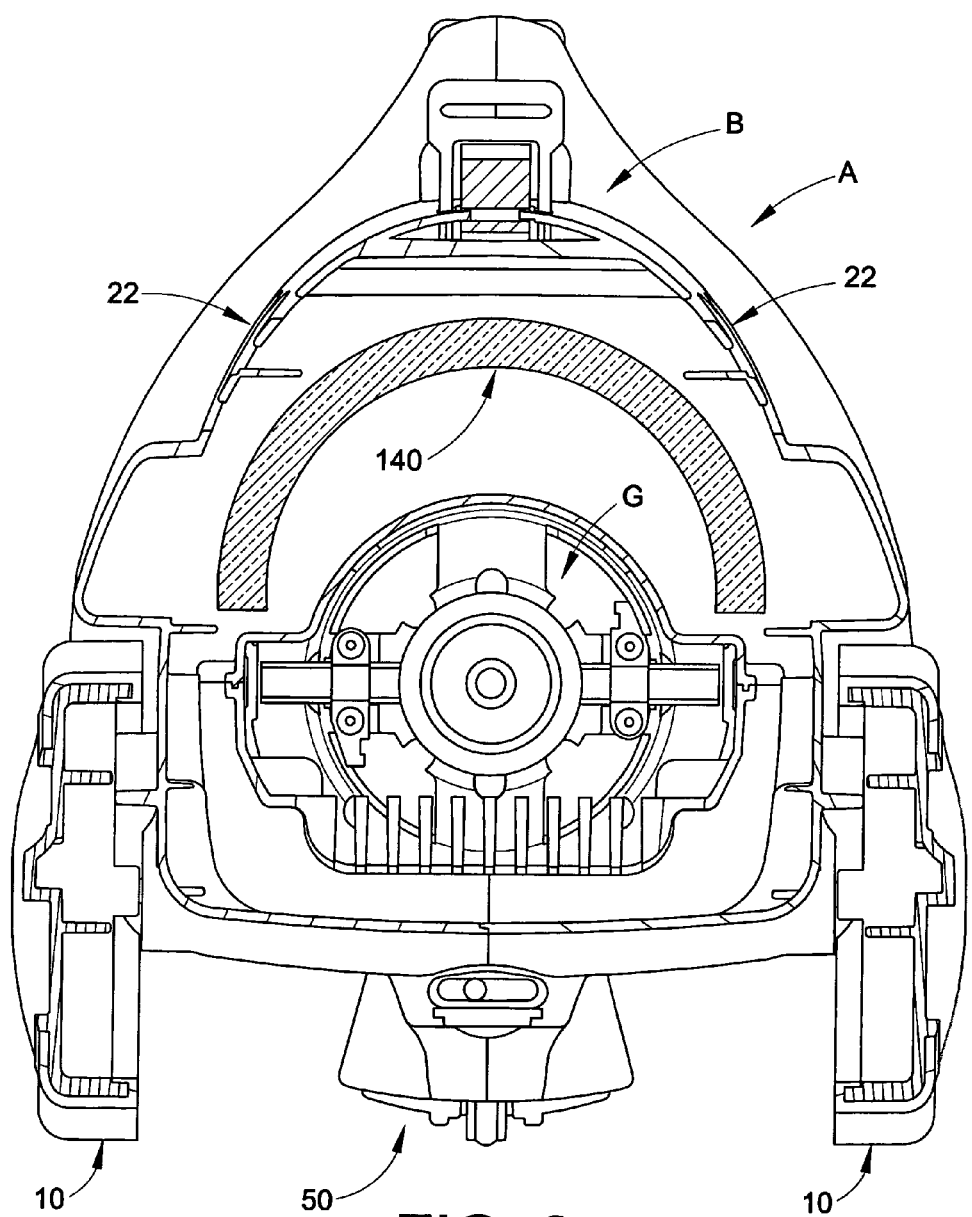
FIG. 8 is a sectional view along line 8—8 of FIG. 2.

Referring now to the drawings, wherein the showings are for purposes of illustrating a preferred embodiment of the invention only and not for purposes of limiting same, FIG. 1 illustrates a bagless canister vacuum cleaner A formed in accordance with the present invention. The vacuum cleaner A generally comprises a main housing B, a cover C, a dirt cup D, a hose E, a filter assembly F (FIG. 6) positioned in the dirt cup, and a suction source G (FIGS. 5,6,8). A tool, such as a crevice tool H illustrated herein, is carried by the distal end of the hose. The main housing B includes or defines a handle 26 to facilitate carrying of the vacuum cleaner A. First and second strap supports 28a,28b are connected to the main housing B and project outwardly therefrom. A carrying strap S (shown only partially) is connected at opposite ends to the supports 28a,28b, respectively, and can be placed over the shoulder of a user for hands-free carrying of the vacuum cleaner A.

The main housing B is defined from a plurality of interconnected molded plastic pieces. One or more wheels 10 are rotatably connected to the main housing and movably support same on a floor or other support surface.

As illustrated in FIGS. 5, 6 and 8, the main housing supports the suction source G therein. The suction source can comprise an electrically driven motor operably coupled to a fan/impeller assembly that rotates in response to operation of the motor. The suction source G establishes and maintains an airstream that flows from an suction source inlet 20 to an exhaust outlet 22, both defined by the housing B.

The dirt cup D is releasably connected to the main housing B. With reference to FIGS. 4–6 and 9, the dirt cup D is defined as a one-piece construction or from a plurality of interconnected pieces of molded plastic, and a hollow interior dirt separation chamber 30 is defined therein by an inner wall 31. At least the portion of the dirt cup D in which the dirt separation chamber 30 is defined can be molded from transparent or partially transparent plastic so that a user of the vacuum cleaner A can view the dirt and other contents or at least appreciate the volume of the contents.

The dirt cup D defines an open first end 32 and an end wall 34 closes the opposite, second end thereof. However, a dirt cup airstream outlet 36 is defined through the end wall 34 and is located and dimensioned to mate closely with the suction source inlet 20 when the dirt cup D is operably connected to the main housing B as illustrated, e.g., in FIGS. 4 and 5. An O-ring gasket or the like 38 can be located at the interface of the dirt cup airstream outlet and the suction source inlet 20 and sealingly engages these openings. If desired, a screen or filter 40 can be positioned in the suction source inlet 20 as an emergency filter to prevent passage of potentially damaging contaminants into the suction source G should any pass through the dirt cup airstream outlet 36 due to a malfunction or misuse of the vacuum cleaner.

Figure 2:
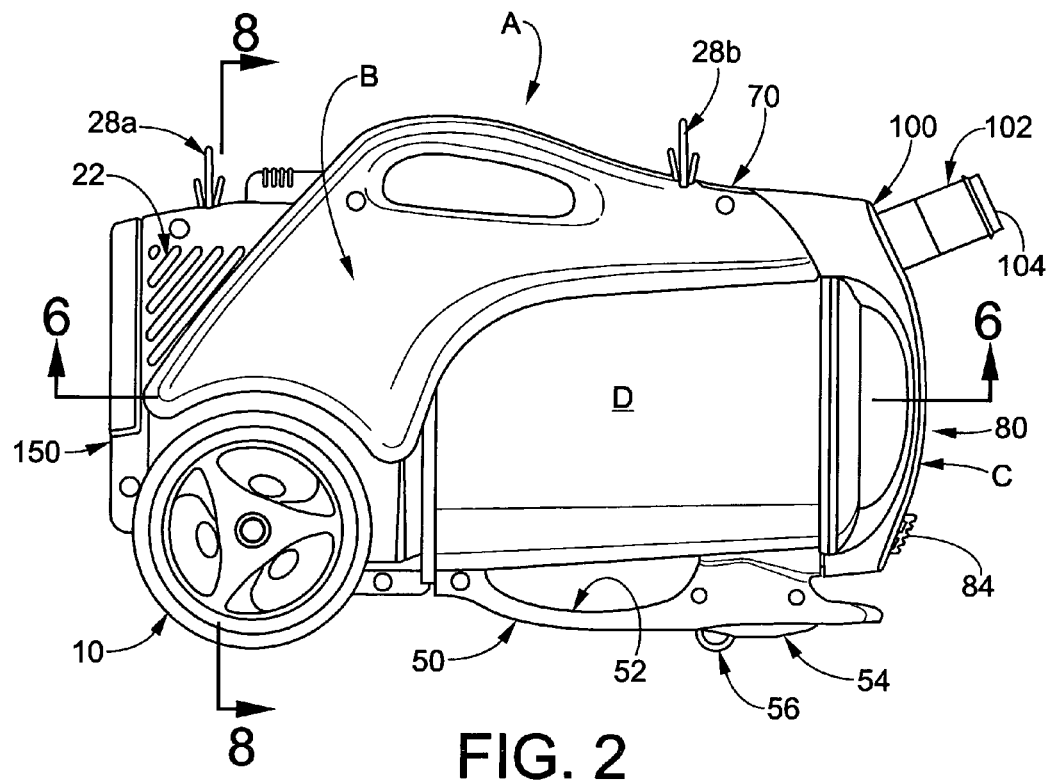
FIG. 2 is a left side elevational view of the vacuum cleaner shown in FIG. 1.
Figure 3:
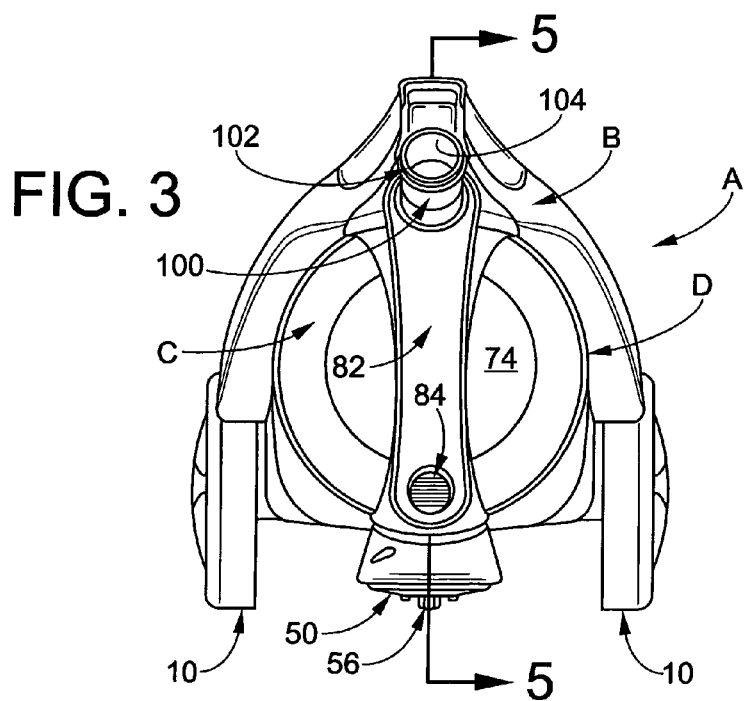
FIG. 3 is a front elevational view of the vacuum cleaner shown in FIG. 1.

The dirt cup D further comprises an external handle assembly 50 projecting outwardly therefrom. The handle assembly comprises a handle member 52 adapted for being held by a user of the vacuum cleaner A, and a wheel assembly 54. When the dirt cup D is operably connected to the main housing B as shown in FIGS. 1–3, and with the vacuum cleaner A in its operative position, the wheel assembly 54 works together with the wheels 10 to movably support the vacuum cleaner A on a floor or other support surface. The wheel assembly 54 includes a caster wheel or the like 56 that facilitates steering of the vacuum cleaner A on the floor or other support surface. In an alternative embodiment, multiple wheels can be connected to the dirt cup without departing from the overall scope and intent of the present invention.

The dirt cup D, adjacent the open first end 32 and opposite the handle assembly 50, includes or defines a spout 58. The spout facilitates emptying of dirt and other contents of the dirt cup in a pouring operation when a user is holding the dirt cup by the handle assembly 56.

Figure 9:
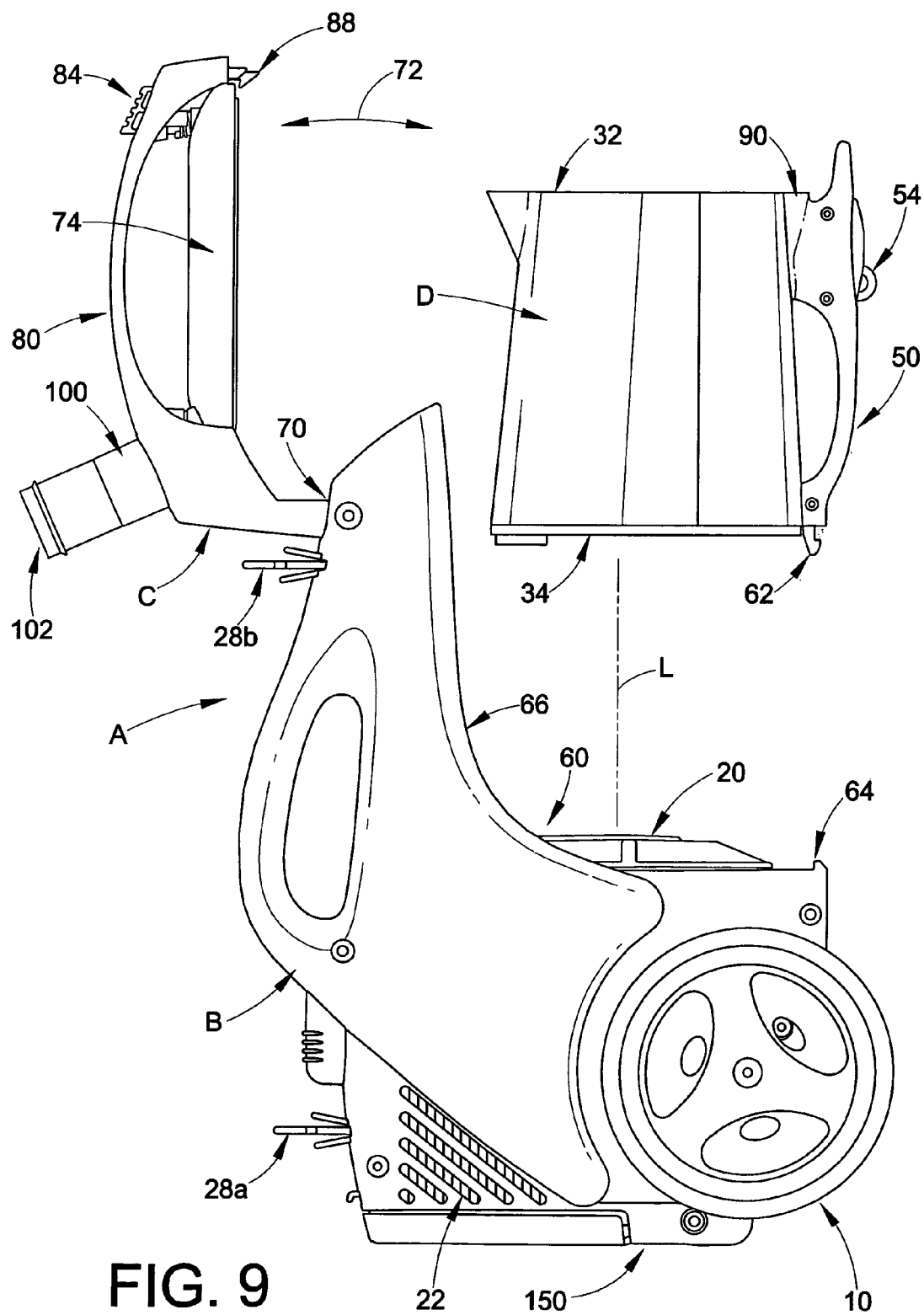
FIG. 9 is an exploded left side view of the vacuum cleaner shown in FIG. 1, with the cover in an open position and with the dirt cup separated from the main housing for emptying.

With reference to FIGS. 5 and 9, the main housing B defines a socket, recess or other receiver region 60 adapted to receive the dirt cup therein so that the dirt cup is operably positioned. The dirt cup D, itself, includes or defines a tongue or like projection 62 adjacent the second end thereof that releasably mates with a corresponding female receptacle 64 secured to or defined by the housing B. The members 62,64 are engageable with a sliding action and disengageable with a reverse sliding action while the dirt cup D is simultaneously tilted or pulled away from the inner wall 66 of the housing recess 60 by application of manual force on the handle 52.

Figure 4:
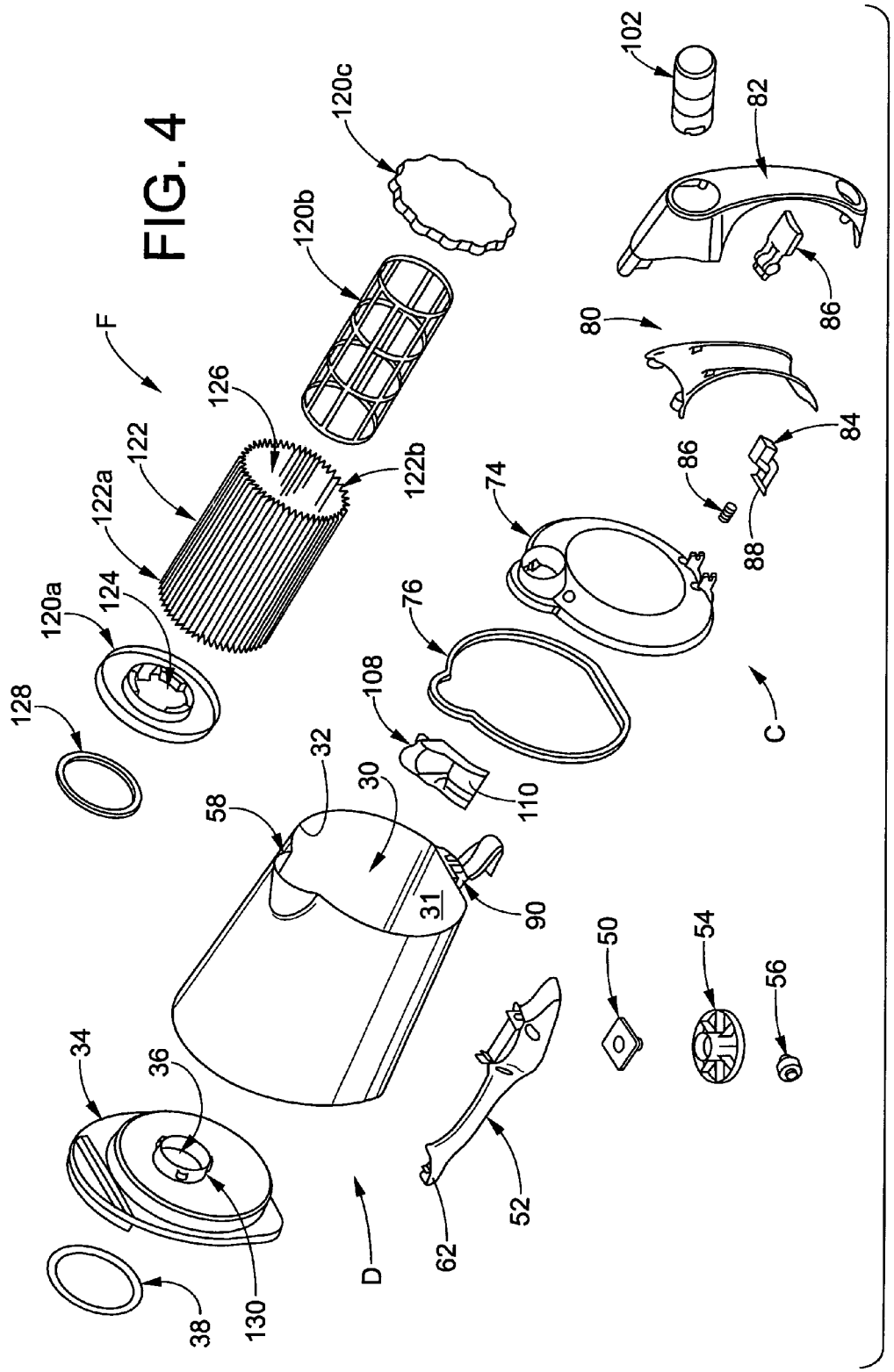
FIG. 4 is an exploded perspective view of a dirt cup and associated filter assembly of the vacuum cleaner shown in FIG. 1.

The cover assembly C of the vacuum cleaner A is pivotally or otherwise movably connected to the main housing B. As shown herein, the cover assembly C is pivotally connected to the main housing B by a hinge assembly 70 so that it pivots on an arc 72 (FIG. 9) between an open or inoperative position (as shown in FIG. 9) and a closed or operative position (as shown in FIGS. 1–3, 5, 6). With reference briefly to FIG. 4, the cover assembly C comprises a cover member 74 adapted to sealingly engage and close the open first end 32 of the dirt cup D when the cover assembly C is operably positioned. A gasket 76 is connected to the inner face of the cover member 74 and sealingly engages the cover member 74 to the open first end 32 of the dirt cup D.

Referring also to FIGS. 5 and 9, a handle assembly 80 is connected to and projects outwardly from the cover member 74. The handle assembly 80 includes a handle 82 adapted for being held by a user of the vacuum cleaner A for purposes of pivoting the cover member 74 on the arc 72. A latch 84 is connected to the cover member 74 and is biased into a normally engaged position by a spring 86. A portion of the latch 84 projects through the handle 82 and is manually operable by a user to disengage a projecting tongue 88 of the latch 84 from a mating female portion 90 connected to or defined in the dirt cup D or, alternatively, the housing B. With the latch disengaged, the cover member 74 is freely movable away from the open first end of the dirt cup D. In contrast, with the cover member 74 seated on the open first end of the dirt cup and with the latch 84 of the cover assembly engaged with the portion 90 of the dirt cup, the dirt cup is fixedly and operably secured in the housing recess 60 with the dirt cup airstream outlet 36 fluidically communicating with the suction source inlet 20 as described.

A hose fitting 100 is connected to or forms a part of the cover assembly C. The hose fitting 100 comprises an inlet conduit 102 that projects outwardly away from the cover assembly C and that is adapted for connection to a conventional vacuum cleaner hose E (FIG. 1) so that the hose communicates with a passage 104 formed through the inlet conduit 102. The hose fitting 100 further comprises an outlet conduit 108 that, together with the cover member 74 defines a passage 110 that communicates with the passage 104 in the inlet conduit 102. With the cover assembly C in its operative position, the outlet conduit 108 is located in or adjacent the open first end 32 of the dirt container D so that the passages 104,110 are both in fluid communication with the dirt separation chamber 30 defined in the dirt cup D. As illustrated herein, the outlet conduit 108 can be obliquely arranged relative to the interior wall 31 of the dirt container D so that an airstream delivered to the dirt separation chamber 30 from the outlet 108 is directed toward the dirt cup inner wall 31 adjacent the open first end of the dirt cup D. This imparts a rotational pattern to the airstream that enters the dirt separation chamber 30 by way of the hose fitting outlet 108.

The filter assembly F is releasably secured in the dirt cup D, and can be located coaxial with the longitudinal axis L thereof as shown in FIG. 5. The filter assembly comprises a frame 120 defined from one or more pieces of molded plastic, and a filter element 122 comprising paper, plastic, or any other suitable filter medium that is carried by the frame 120. The filter element 122 can comprise a pleated washable filter medium such as GORE-TEX® brand polytetrafluoroethylene (PTFE) or another polymeric filter medium. With reference to FIGS. 4 and 5, the filter frame 120 comprises: (i) a base plate 120a adapted to fit adjacent a lower edge 122a of the filter element 122; (ii) an internal skeleton 120b connected at a second end to the base plate 120a and adapted to fit closely within a central opening 126 defined in the filter element 122; and, (iii) a cap 120c connected to a first end of the skeleton 120b and that closes the opening 126 at the upper edge 122b of the element 122.

With continuing reference to FIGS. 4 and 5, the base plate 120a defines an opening 124 adapted to frictionally or otherwise releasably mate with a boss 130 projecting from the end wall 34 of the dirt cup D around the dirt cup airstream outlet 36. A gasket 128 can be connected to the filter assembly base plate 120a to engage and seal together the base plate 120a and the dirt cup end wall 34. With the base plate 120a and boss 130 mated as described or in an equivalent manner, the filter assembly F is releasably connected to the dirt cup in an operative position and is self-supporting within the dirt cup, with a longitudinal axis of the filter assembly F located close to parallel with the support surface (typically at least substantially horizontal) on which the wheels 10,56 are located, i.e., inclined less than about 20°14 25° relative to the associated support surface.

Figure 7:
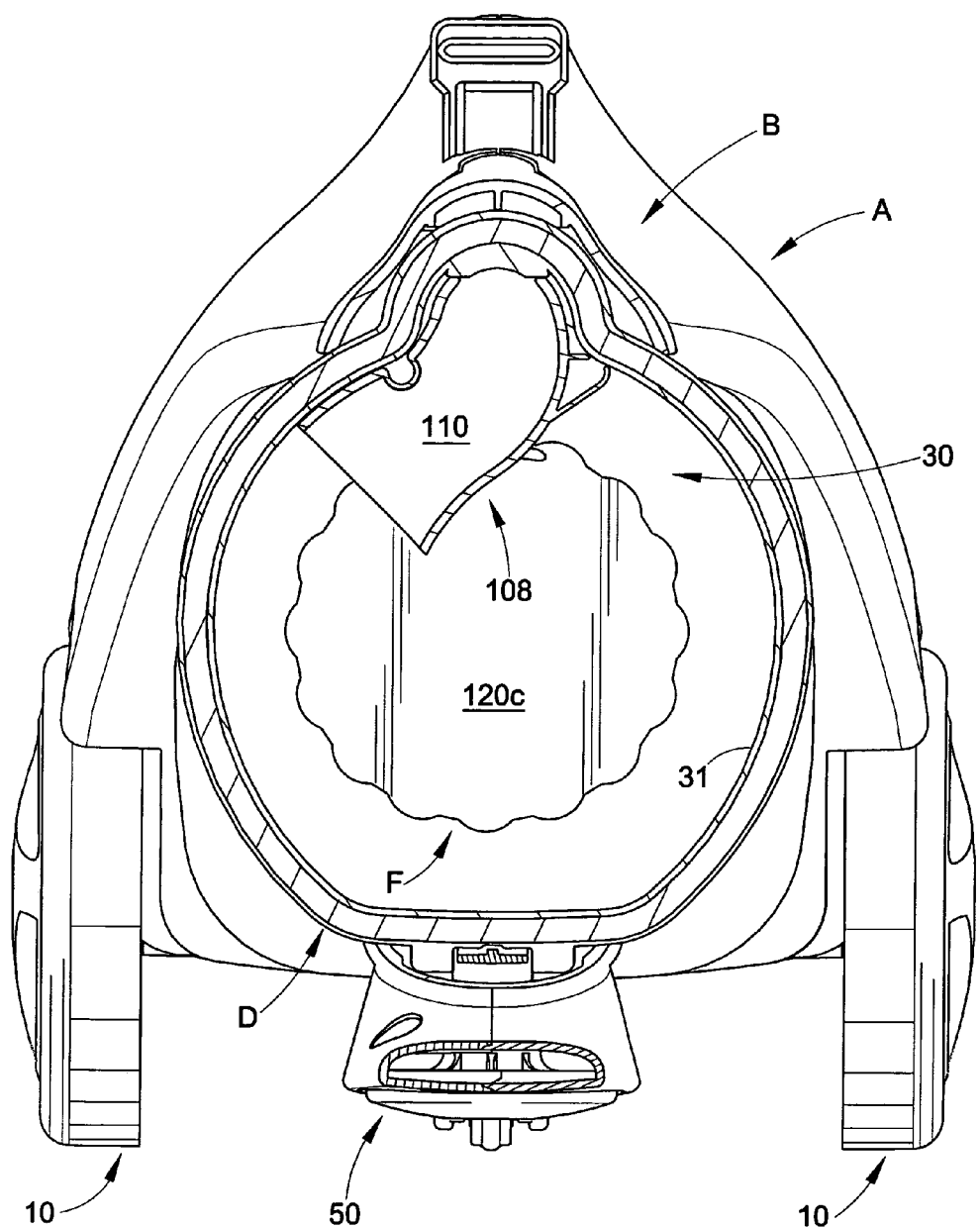
FIG. 7 is a sectional view along line 7—7 of FIG. 5.

With the filter assembly F in its operative position, it is located in covering relation with the dirt cup airstream outlet 36 so that an airstream exiting the dirt separation chamber 30 through the dirt cup airstream outlet 36 must pass through the filter element 122. As shown in FIGS. 4 and 7, the cap 120c of the filter assembly F is defined with an integral scalloped grip or the like to facilitate manual grasping of the filter element F as required to connect same to and disconnect same from the dirt cup D.

Downstream from the suction source G, a final filter or exhaust filter 140 (FIG. 8) can be located between the suction source G and the exhaust outlet 22 of the main body B. The exhaust filter 140, which can comprise a HEPA or conventional filter medium, filters contaminants from the airstream exhausted by the suction source G before same exits the main housing B through the exhaust outlet 22.

Referring now to FIGS. 5–7, in operation, the suction source G establishes and maintains an airstream S that flows from the hose E (FIG. 1) into the dirt separation chamber 30 by way of the hose fitting outlet 108. Owing to the generally annular airflow space defined between the filter assembly F and the dirt cup inner wall 31, and due to the oblique arrangement of the outlet 108 by which the airstream passes into the chamber 30, the airstream flows in a rotational manner around the filter assembly F and simultaneously moves from the open first end 32 toward the opposite end wall 34 of the dirt cup D. The rotational airflow dislodges contaminants that are entrained in the airstream S. The dislodged contaminants are collected in the dirt separation chamber 30. The flow of the airstream as described tends to urge the collected contaminants toward the wall 34 at the second end of the dirt cup D.

The airstream S then passes through the filter element 122 that removes residual contaminants therefrom (a portion of the airstream S also passes through the collected dirt and other contaminants in the dirt cup which act as an auxiliary filter media). After passing through the filter element 122, the airstream S exits the dirt cup D through the dirt cup airstream outlet 36 and flows through the suction source G and is exhausted thereby. The airstream exhausted by the suction source passes through the exhaust filter 140 (FIG. 8) that removes more residual contaminants therefrom, and the airstream then exits the main housing B through one or more exhaust outlets 22.

The main housing B, at a second end opposite the cover assembly C, defines or includes a base 150 conformed to support the vacuum cleaner A in a second, non-operative position on a floor or other support surface with at least the wheel 56 and/or all wheels 10,56 not in contact with the floor or other support surface. The base 150 can be conformed as a face that is adapted to support the vacuum cleaner A with the dirt cup D in an upright position, with the open upper end 32 at a higher elevation than the opposite end wall 34 located at the second end thereof, e.g., with the dirt cup vertically oriented as shown in FIG. 9. With the vacuum cleaner A in this second, non-operative position, the handle assembly 80 of the cover assembly C and the handle assembly 50 of the dirt cup D are freely accessible by a user so that the dirt cup can be separated from, emptied, and reconnected to the main housing as described above.

From the foregoing, it should be apparent that the present invention relates to a new and improved bagless canister vacuum cleaner. The bagless canister vacuum cleaner includes a selectively removable dirt cup, wherein an airstream flows rotationally through the dirt cup between an interior wall of the dirt cup and a filter assembly selectively mounted in the dirt cup so that entrained contaminants are separated from the airstream flowing through the dirt cup and collected by the dirt cup. A cover member is pivotally or otherwise movably connected to a main housing, and the cover member is selectively movable to and held in an operative position in covering relation with an open first end of a dirt cup. Also, the main housing defines a base conformed to self-support the main housing on a support surface with the dirt cup arranged with its open first end at a higher elevation than its closed second end. The removable dirt cup includes a handle adapted for being held by a user, and the dirt cup defines or includes a spout to facilitate emptying dirt therefrom.

The invention has been described with reference to a preferred embodiment. Modifications and alterations will occur to others upon reading and understanding this preceding specification. It is intended that the invention be construed as including all such modifications and alterations insofar as they are encompassed by the appended claims as construed literally and/or according to the doctrine of equivalents.

What is claimed is:

1. A canister vacuum cleaner comprising:
    a body defining a suction inlet and an exhaust outlet;
    a suction source contained in said body and located fluidically between said suction inlet and said exhaust outlet;
    a dirt cup releasably connected to said body, said dirt cup defining a dirt separation chamber and an airstream outlet that releasably mates with said suction inlet when said dirt cup is connected to said body, said dirt separation chamber conformed to impart a rotational flow pattern to an airstream passing therethrough whereby contaminants entrained in said airstream are separated therefrom and deposited in said dirt cup; and,
    a filter located in said dirt separation chamber of said dirt cup in covering relation with said airstream outlet.

2. The canister vacuum cleaner as set forth in claim 1, wherein a first portion of said dirt cup defines said airstream outlet and a second portion of said dirt cup defines an open entrance to said dirt separation chamber, said body comprising a cover that is selectively located in covering relation with said open entrance of said dirt cup when said dirt cup is connected to said body.

3. The canister vacuum cleaner as set forth in claim 2, wherein said cover is pivotably connected to a main portion of said body and pivots on an arc between a first position spaced away from said open entrance of said dirt cup and a second position in covering relation with said open entrance of said dirt cup.

4. The canister vacuum cleaner as set forth in claim 2, wherein an associated hose communicates with said dirt separation chamber of said dirt cup through said movable cover.

5. The canister vacuum cleaner as set forth in claim 4, further comprising a hose fitting connected to and extending through said cover, said hose fitting comprising an inlet conduit projecting outwardly away from said cover external to said body and an outlet conduit located adjacent said open entrance of said dirt cup when said dirt cup is connected to said housing and said cover is placed in covering relation with said open entrance of said dirt cup.

6. The canister vacuum cleaner as set forth in claim 5, wherein said outlet conduit of said hose fitting is directed obliquely toward an interior wall of said dirt cup when said cover is placed in covering relation with said open entrance of said dirt cup whereby an airstream entering said dirt separation chamber from said outlet conduit of said hose fitting is directed obliquely at said interior wall of said dirt cup.

7. The canister vacuum cleaner as set forth in claim 1, wherein said filter is releasably connected to said dirt cup.

8. The canister vacuum cleaner as set forth in claim 1, wherein an annular airflow space is defined between said filter and an interior wall of said dirt cup that defines said dirt separation chamber, and wherein said canister vacuum cleaner further comprises:
    a plurality of wheels connected to said body and adapted to support said body movably on an associated support surface in an operative position wherein said filter is inclined relative to said associated support surface.

9. The canister vacuum cleaner as set forth in claim 8, further comprising at least one additional wheel connected to said dirt cup, said plurality of wheels and said additional wheel movably supporting said body and dirt cup connected to said body on an associated support surface.

10. The canister vacuum cleaner as set forth in claim 9, wherein said filter extends axially in said dirt cup along a longitudinal axis that is parallel to the associated support surface when said body and dirt cup are movably supported on the associated support surface.

11. The canister vacuum cleaner as set forth in claim 8, wherein said dirt cup includes an end wall that defines said airstream outlet, said filter projecting outwardly from said end wall and unsupported by said dirt cup between said end wall and an outer end of said filter that is spaced from said end wall.

12. The canister vacuum cleaner as set forth in claim 10, further comprising an exhaust filter located in said body in covering relation with said exhaust outlet.

13. A bagless canister vacuum cleaner comprising:

a main housing defining an airflow inlet, an airflow outlet and a receiver region adapted to receive a dirt cup;

a suction source located in said housing and operational to establish and maintain an airstream that flows from said airflow inlet to said airflow outlet; a dirt cup releasably coupled to said receiver region of said main housing, said dirt cup comprising:
  (i) an interior wall defining a dirt separation chamber conformed to impart a rotational flow path to a dirty airstream passing therethrough whereby contaminants are separated from the dirty airstream and deposited in said dirt cup;
  (ii) an open first end in communication with said dirt separation chamber; and,
  iii) an airstream outlet from said dirt separation chamber, said dirt cup releasably coupled to said main housing with said airstream outlet of said dirt cup mated with said airflow inlet of said main housing;

a filter assembly releasably connected to said dirt cup and located in said dirt separation chamber, said filter assembly comprising a filter element located in covering relation with said airstream outlet of said dirt cup; and, a cover connected to said housing, said cover movable between an open position, where said cover is disengaged from said dirt cup, and a closed, operative position where said cover is placed in covering relation with and blocks said open first end of said dirt cup, said cover, when located in said closed, operative position, preventing separation of said dirt cup from said main housing.

14. The bagless canister vacuum cleaner as set forth in claim 13, further comprising a handle connected to said cover to facilitate manual movement of said cover between said open and closed positions.

15. The bagless canister vacuum cleaner as set forth in claim 13, further comprising a hose and a hose fitting interconnecting said hose to said cover, said hose fitting comprising a first portion projecting outwardly away from said cover and a second portion projecting into said dirt separation chamber adjacent said open first end of said dirt cup, said second portion directed obliquely toward said interior wall of said dirt cup defining said dirt separation chamber.

16. The bagless canister vacuum cleaner as set forth in claim 13, further comprising: a plurality of wheels for movably supporting said main housing and said dirt cup on a support surface when said dirt cup is coupled to said receiver region of said main housing, at least one of said plurality of wheels connected to said dirt cup.

17. The bagless canister vacuum cleaner as set forth in claim 16, wherein said dirt cup comprises a handle and wherein said at least one of said plurality of wheels connected to said dirt cup is connected to said handle.

18. A bagless vacuum cleaner comprising:

a body;

a dirt cup releasably connected to and selectively separable from said body, said dirt cup comprising a handle and pour spout;

a lid connected to said body and adapted for selectively covering an open end of said dirt cup; and, a handle connected to said lid.

19. The bagless vacuum cleaner as set forth in claim 18, wherein said handle and pour spout are located opposite each other.

20. The bagless vacuum cleaner as set forth in claim 18, further comprising a second handle, said second handle connected to said body.

21. The bagless vacuum cleaner as set forth in claim 18, further comprising:

a strap connected to said body, said strap adapted for securing said bagless vacuum cleaner to a body of a user.

22. A bagless vacuum cleaner comprising:

a body;

a dirt cup releasably connected to and selectively separable from said body, said dirt cup comprising a handle and pour spout;

at least one wheel connected to said body; and, at least one wheel connected to said dirt cup.

* * * * *